(12) United States Patent
Brizmer et al.

(10) Patent No.: US 11,078,960 B2
(45) Date of Patent: Aug. 3, 2021

(54) ROLLING CONTACT BEARING WITH IMPROVED PERFORMANCES

(71) Applicant: Aktiebolaget SKF, Göteborg (SE)

(72) Inventors: Victor Brizmer, Utrecht (NL); Francesco Lamboglia, Pinerolo (IT); Ralph Meeuwenoord, Nieuwegein (NL); Hubertus Laurentius Maria Peek, Gaastmeer (NL)

(73) Assignee: AKTIEBOLAGET SKF

( * ) Notice: Subject to any disclaimer, the term of this patent is extended or adjusted under 35 U.S.C. 154(b) by 0 days.

(21) Appl. No.: 16/736,132

(22) Filed: Jan. 7, 2020

(65) Prior Publication Data
US 2020/0217365 A1 Jul. 9, 2020

(30) Foreign Application Priority Data

Jan. 9, 2019 (IT) .................. 102019000000238

(51) Int. Cl.
*F16C 33/58* (2006.01)
(52) U.S. Cl.
CPC ........ *F16C 33/586* (2013.01); *F16C 2240/54* (2013.01); *F16C 2326/02* (2013.01)
(58) Field of Classification Search
CPC .............................. F16C 33/58; F16C 2240/54
See application file for complete search history.

(56) References Cited

U.S. PATENT DOCUMENTS

| 5,586,826 A | * | 12/1996 | Kellstrom | F16C 23/086 384/450 |
| 5,641,038 A | * | 6/1997 | Akamatsu | F16C 19/24 184/6.17 |
| 2005/0207687 A1 | | 9/2005 | Fujita et al. | |
| 2007/0065061 A1 | | 3/2007 | Fukami et al. | |
| 2007/0081753 A1 | * | 4/2007 | Matsuzaki | F16C 23/086 384/569 |
| 2009/0016664 A1 | * | 1/2009 | Tsujimoto | F16C 33/36 384/576 |

FOREIGN PATENT DOCUMENTS

| DE | 102017113701 A1 | * | 12/2018 | ............. F16C 19/26 |
| EP | 1770290 | | 4/2007 | |
| JP | H0317725 | | 5/1991 | |
| JP | H04327019 | | 11/1992 | |
| JP | H0642536 | | 2/1994 | |
| JP | 2000205284 | | 7/2000 | |
| JP | 2003314561 | | 11/2003 | |
| JP | 2007085512 | | 4/2007 | |
| JP | 2009039142 A | * | 2/2009 | |

OTHER PUBLICATIONS

International Search Report for corresponding Italy Patent Application No. 102019000000238 dated Sep. 27, 2019.

* cited by examiner

*Primary Examiner* — Phillip A Johnson
(74) *Attorney, Agent, or Firm* — Reed Smith LLP

(57) ABSTRACT

A rolling contact bearing, wherein the surface of the raceways of an outer member and/or an inner member are randomly formed with an innumerable number of microconcavelike pits, the surfaces are provided with said pits having a surface roughness value smaller than 0.25 microns and a skewness Rsk value such that $-3.5 < \text{Rsk} < -1.0$.

3 Claims, No Drawings

ROLLING CONTACT BEARING WITH IMPROVED PERFORMANCES

CROSS-REFERENCE TO RELATED APPLICATION

This application is based on and claims priority under 35 U.S.C. § 119 to Italian Application No. 102019000000238, filed Jan. 9, 2019, the entire contents of which are incorporated herein by reference.

FIELD

The exemplary embodiments disclosed herein relate to a rolling contact bearing, for example, a rolling contact bearing used in the wheel hub of an automobile.

BACKGROUND

In the motor vehicle industry, rolling contact bearings for wheel hubs comprise an outer member and an inner member, rolling elements placed between the outer member and the inner member, that are in turn provided with relevant raceways for the rolling elements.

DETAILED DESCRIPTION

The exemplary embodiments disclosed herein provide a rolling contact bearing with improved performances, confronting mainly the problem of avoiding fretting and reducing friction, and optimizing the relevant perfomances.

In order to reduce damages such as either friction, or fretting due to poor lubrication, technological measures are taken against these damages by providing microconcave pits in the raceways and by setting the relevant parameters, such as roughness Ra and skewness, Rsk, that is the degree of distortion of the roughness curve.

A rolling contact bearing, preferably a rolling contact bearing used in the wheel hub of an automobile, is composed of an inner member or inner ring, an outer member or outer ring, and rolling elements placed between the outer member and the inner member.

The outer member and the inner member are also provided with relevant raceways for the rolling elements, and the raceway surfaces of the inner or the outer member are microroughened surfaces, meaning they are formed with an innumerable number of randomly formed microconcave, or alternatively microconcave-like, pits for surface-microroughening that are also composed of a succession of plateaus and valleys, wherein plateaus, as it will be disclosed hereinafter, reduce local pressures within the contact between rolling elements and rings, while deep valleys serve as grease reservoirs.

According to exemplary embodiments, in these raceway surfaces, in order to enhance fretting (false brinelling) performance in the rolling contact bearing, the roughness value Ra is configured to fall in the range between 0.1 and 0.25 microns and, in combination, the skewness Rsk is configured to be also negative and in the range $-3.5<Rsk<-1.0$.

The combination of a roughness value Ra in the range between 0.1 and 0.25 microns and of a negative skewness Rsk within the range $-3.5<Rsk<-1.0$ generates a raceway topography where deep valleys prevail over peaks and, more particularly, it eliminates the peaks by providing plateaus with lower surfaces. The lower surface plateaus will reduce local pressures within the contact, while the deep valleys will serve as grease reservoirs thus enhancing lubrication. Lower local pressure and better lubrication will reduce the risk of fretting damage.

To the extent to achieve the exemplary embodiments, experimental test have shown that this goal is achieved if roughness value Ra is less than 0.25 microns in order to avoid jeopardizing the raceway fatigue performance, and because a greater value would not be clearly beneficial to fretting performance. Meanwhile, when it comes to friction the skewness Rsk is configured to be in the range $-3.5<Rsk<-1.5$ and the ideal situation is to configure Rsk as much negative as possible to reduce friction at medium speed, but the static friction and low speed friction increases with more negative Rsk and the current machining technologies and standard processes do not allow to achieve high negative Rsk values, therefore, in view of what just mentioned a value of the skewness Rsk greater than or close to $-3.5$ represents a good trade off point.

In boundary lubrication regime (a), the fraction of solid-to-solid asperity contacts is smaller for neutral than for negative skewness. In the latter case, all the plateau is likely to come in contact with the counterpart (which is assumed to be smooth for simplicity). The bigger fraction of solid-to-solid asperity contacts in the case of negative skewness leads to a somewhat higher friction.

In mixed lubrication (b), however, the opposite is true: when the lubricant film becomes thick enough to separate the plateau (e.g. with increasing the speed), the fraction of solid-to-solid contacts becomes smaller in the case of negative skewness, corresponding to a lower friction. Finally, in the case of full-film elastohydrodynamic (EHL) lubrication (c), the solid-to-solid asperity contacts disappear, and the friction becomes insensitive to the surface roughness parameters.

According to exemplary embodiments, as far as the above mentioned raceway surfaces of the rolling contact bearing are concerned, in order to enhance friction performance, the roughness value Ra is configured to be lower than 0.1 microns and, in combination, the skewness Rsk is configured to be, again, also negative and in the range $-3.5<Rsk<-1.0$.

Negative skewness Rsk in combination with roughness value Ra smaller than 0.1 microns corresponds to a raceway topography with fine roughness and without any high peaks, but with a series of plateau with valleys. Such topography is characterized by grease reservoirs and absence of high asperities therefore providing less solid-to-solid contacts in mixed lubrication which means lower friction.

The above disclosed combination of negative skewness Rsk and roughness values Ra provide either a lower fretting or a lower friction with the further advantage of using the same grease, meanwhile it provides also a 10% loaded ballset friction reduction at medium speeds.

It is to be understood that the invention is not limited to the exemplary embodiments described and shown herein, which are to be considered as examples of the assembly and of the methods of assembling it; it is clear to the experts in the field that numerous modifications can be made in terms of forms, dimensions, design and functional details and the configuration of the elements described in the exemplary embodiments, without thereby departing from the scope of the invention as defined in the accompanying claims and their equivalents.

What is claimed is:

1. A rolling contact bearing, comprising
an outer member;
an inner member; and at least one raceway on the outer member or the inner member, wherein a surface of the at least one raceway is a microroughened surface having a skewness (Rsk) value such that $-3.5<\text{Rsk}<-1.5$ and a surface roughness value (Ra) less than 0.1 microns.

2. A rolling contact bearing, comprising
an outer member;
an inner member; and
at least one raceway on the outer member or the inner member, wherein a surface of the at least one raceway is a microroughened surface having a skewness (Rsk) value such that $-3.5<\text{Rsk}<-1.0$ and a surface roughness value (Ra) less than 0.1 microns.

3. The rolling contact bearing of claim 2, wherein the microroughed surface comprises a plurality of microconcave pits.

* * * * *